Jan. 20, 1953          J. J. HITOV          2,625,735
END SEAL FOR PRINTING ROLLERS
Filed Dec. 7, 1948
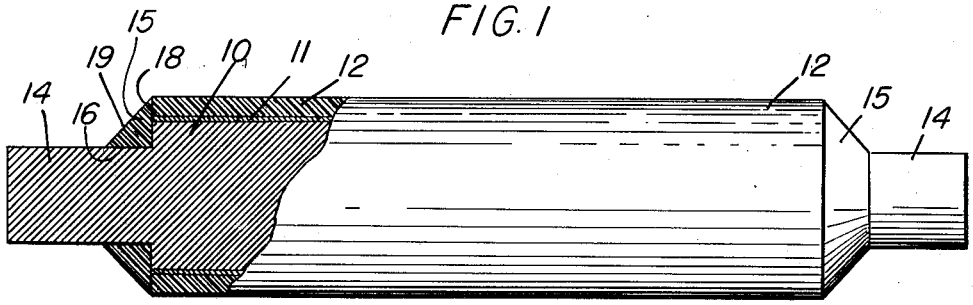
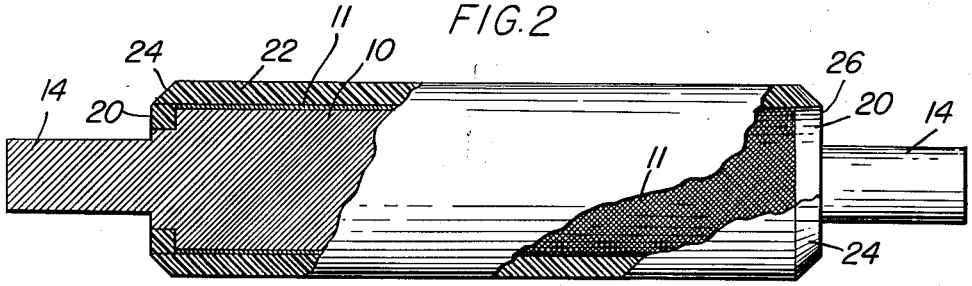
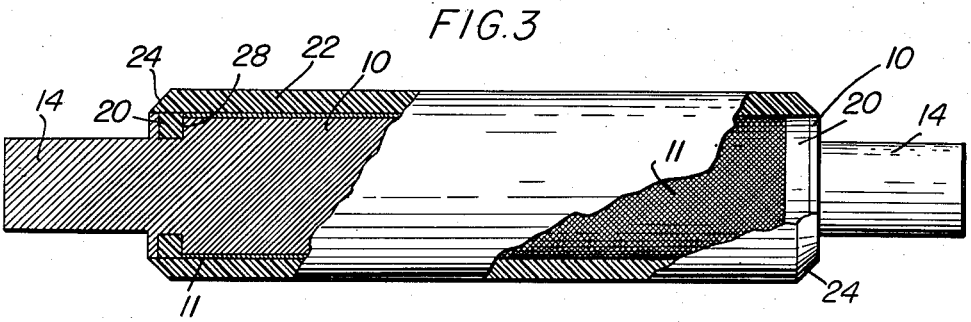
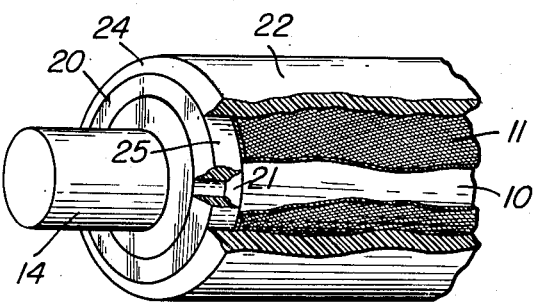
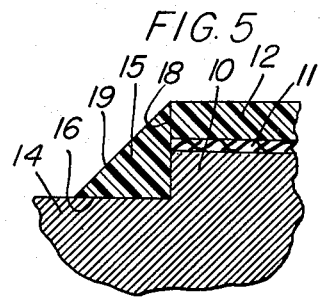
Inventor
By Joseph J. Hitov
Attorneys Patented Jan. 20, 1953

2,625,735

UNITED STATES PATENT OFFICE 2,625,735

END SEAL FOR PRINTING ROLLERS

Joseph J. Hitov, Belleville, N. J., assignor to Resistoflex Corporation, Belleville, N. J., a corporation of New York Application December 7, 1948, Serial No. 63,905

4 Claims. (Cl. 29—119)

This invention relates to rollers of the type used in printing apparatus for the distribution of ink and more particularly to rollers for use with inks containing hydrocarbon, ketone and ester solvents.

As is known, rollers of this type have a rigid core, usually metal, either solid or hollow and including trunnions at each end which enable the roller to be mounted in bearings. The portion of the roller between the trunnions is covered with a layer of resilient material which constitutes its working surface, this layer having substantial thickness.

It has been found that plasticized polyvinyl alcohol compositions are admirably suited for use as the working surfaces of rollers used with hydrocarbon, ketone and ester solvent inks, because they are entirely unaffected by the ink solvents. Compositions of this type will be referred to hereinafter as "compar," the name used to designate them in the trade and meaning compounded modified polyvinyl alcohol resin.

Compar is a tough, resilient, somewhat elastic material and is adapted to being formed by molding or extrusion and may be ground to size in forming the final surface of the roller. A problem arises, however, in fastening it securely to the metal core since compar will not adhere to metal as will other types of roll coverings. Compar may be readily adhered, however, to porous and fibrous materials such as paper, cloth, wood, leather, cork and felt and particularly well to cellulosic materials such as paper and cotton cloth. Compar is water-soluble and may be firmly adhered to such materials by means of an aqueous polyvinyl alcohol solution. Two adjacent layers of compar may similarly be joined, particularly if heat is applied to the joint in the form of steam or otherwise, the layers fusing together and forming a bond as strong as the material itself.

The aforesaid porous and fibrous materials are readily adhered to metal by known adhesives. Certain cements may also be used which will adhere compar to metal but at present they do not give as good a bond as where an intermediate layer of cloth or the like is employed. It is contemplated, however, that better cements may be discovered.

The compar roller covering, after being formed by any suitable process to the desired tubular form, is therefore placed on a metal core which has preferably first had adhered to it, by any appropriate adhesive, a layer of material to which compar can be adhered, preferably a cotton textile fabric. This layer may be in the form of cotton adhesive tape spirally wrapped to cover the surface of the metal roller or may be a layer of cloth adhered to the roller. Paper or felt may be used instead of cloth. This fibrous layer is then coated with polyvinyl alcohol solution and the compar cover slipped over it. The water in said solution diffuses through the cover and the latter becomes firmly anchored to the core. Alternatively, the compar cover is placed on a metal core coated with adhesive capable of adhering both to metal and to compar.

A roller formed as above described does not stand up in use, however, because the ink solvents, which in time spread over the ends of the roller are absorbed by the exposed ends of the fibrous bonding layer, where such layer is used, which acts as a wick, and these solvents attack the adhesive which holds the bonding layer to the metal roll, or they attack the cement adhering the compar to the metal, with the result that the roller covering loosens progressively inwardly from the ends.

The present invention is directed to the solution of this problem and does so satisfactorily by the means hereinafter described in conjunction with the drawings in which:

Fig. 1 is an elevation, partly in section, of a roller having an end seal in accordance with the invention;

Fig. 2 is a similar view of another roller, parts being broken away, showing a second form of end seal;

Fig. 3 is a view like Fig. 2 showing a third form of end seal;

Fig. 4 is a perspective view of the form of end seal shown in Fig. 2, with parts broken away to show the construction; and Fig. 5 is an enlarged detailed section of the end seal structure of Fig. 1.

The invention, as illustrated in the several embodiments, is characterized by the use of a sealing ring which surrounds a portion of the end of the metal roller so as to engage it tightly, said ring having a face abutting a face of the covering of the roller, the covering and sealing ring being bonded or fused together at their adjoining faces so as to seal completely the adhesive layer alone or the fibrous layer and its adhesive layer against access by ink solvents and thus prevent loosening of the covering from the metal roller during use. Preferably, though not necessarily, the portion of the roller engaged by the ring is radially displaced inwardly from the surface to which the bonding layer is applied.

While the invention is herein particularly illustrated by reference to a roller having compar covering and sealing rings, it will be apparent that it is equally applicable to rollers having coverings of other materials which require the use of adhesives affected by ink solvents.

Referring to Figs. 1 and 5, the metal core of the roller is shown at 10, the layer of cloth or the like at 11, the compar cover at 12, and the trunnions at 14. To seal the cloth layer 11 and the adhesive which secures it to the core against access by ink solvents a sealing ring 15 of compar is employed which is preformed with a bore 16 having an internal diameter slightly less than the outer diameter of the trunnion and a flat radially extending face 18. Ring 15 is forced over the trunnion 14, cementing solution is applied to the adjacent faces of cover 12 and ring 15 and the ring held in engagement with the cover while the joint fuses. The joint may be heated to hasten the fusion. The ring 15 may have a rectangular cross-section when applied and after it has been joined to the cover 12 it may be ground to form the conical surface 19. Alternatively, the ring 15 may be preformed with a conical face.

Referring to Figs. 2 and 4, the sealing ring is shown at 20, has a square cross-section and is seated in an annular recess 21 cut in the end of the roller and underlying the end of cover 22 which in this instance is beveled at 24. In this embodiment the outer surface 25 of ring 20 is fused to the inner end surface 26 of the cover 22, the cloth 11 terminating at the inner face of recess 21. Ring 20 is formed so as to require slight stretching to seat it in the recess, thus assuring a tight seal.

Fig. 3 shows a further modification utilizing the same ring shown in Figs. 2 and 4 the ring being seated, however, in a groove 28 spaced inwardly a short distance from the end of roller core 10. Ring 20 may be made of compar having sufficient elasticity to be stretched over the end of the core and seated in groove 28 or it may be cut, placed in the groove and its ends fused together at the same time that the ring and cover are fused together. In this form of the invention the ring, by being properly proportioned relative to groove 28, can seal against the opposed side walls of the groove.

While the invention has been described with reference to specific embodiments, they are to be treated as merely illustrative, the invention being construed broadly within the purview of the claims.

What is claimed is:

1. In a printing roller having a core, an outer cover on said core of material characterized by the property of non-adherence to the material of the core, and a separate bonding layer therebetween adhered on one side to the core and on the other side to said cover which layer includes adhesive and fibrous material having a wick action; an end seal adapted to protect said bonding layer comprising a surface on said core displaced radially inwardly from the end of said bonding layer, a ring of resilient material of a composition similar to that of said cover tightly engaging said surface by being stretched thereover, said ring extending radially outwardly into engagement with a continuous surface of said cover adjacent an end thereof, said ring and said cover having their contiguous surfaces fused together and said ring extending across the end of said bonding layer and radially inwardly past the end thereof.

2. A roller according to claim 1 wherein said core terminates in a shouldered end portion of reduced diameter, said ring being stretched over said end portion.

3. A roller according to claim 1 wherein said core has an annular recess adjacent its end and underlying said cover, said ring being positioned in said recess.

4. A roller according to claim 1 wherein said core has a groove spaced inwardly a short distance from its end and underlying said cover, said ring being positioned in said groove.

JOSEPH J. HITOV.

REFERENCES CITED

The following references are of record in the file of this patent:

UNITED STATES PATENTS

| Number | Name | Date |
|---|---|---|
| 1,669,942 | Linder | May 15, 1928 |
| 1,856,085 | Walters | May 3, 1932 |
| 2,312,853 | Toland et al. | Mar. 2, 1943 |